US012437904B2

(12) United States Patent
Kumeda et al.

(10) Patent No.: US 12,437,904 B2
(45) Date of Patent: Oct. 7, 2025

(54) RESISTANCE ALLOY FOR USE IN SHUNT RESISTOR, USE OF RESISTANCE ALLOY IN SHUNT RESISTOR, AND SHUNT RESISTOR USING RESISTANCE ALLOY

(71) Applicant: KOA CORPORATION, Nagano (JP)

(72) Inventors: Yoshitaka Kumeda, Nagano (JP); Tadahiko Yoshioka, Nagano (JP)

(73) Assignee: KOA Corporation, Nagano (JP)

( * ) Notice: Subject to any disclaimer, the term of this patent is extended or adjusted under 35 U.S.C. 154(b) by 351 days.

(21) Appl. No.: 18/022,926

(22) PCT Filed: Jul. 16, 2021

(86) PCT No.: PCT/JP2021/026813

§ 371 (c)(1),
(2) Date: Feb. 23, 2023

(87) PCT Pub. No.: WO2022/044611

PCT Pub. Date: Mar. 3, 2022

(65) Prior Publication Data

US 2023/0326631 A1 Oct. 12, 2023

(30) Foreign Application Priority Data

Aug. 31, 2020 (JP) ................................ 2020-145278

(51) Int. Cl.

| | |
|---|---|
| ***H01C 1/00*** | (2006.01) |
| ***C22C 9/05*** | (2006.01) |
| ***C22F 1/02*** | (2006.01) |
| ***C22F 1/08*** | (2006.01) |
| ***H01C 7/13*** | (2006.01) |

(52) U.S. Cl.
CPC ................ *H01C 1/00* (2013.01); *C22C 9/05* (2013.01); *C22F 1/02* (2013.01); *C22F 1/08* (2013.01); *H01C 7/13* (2013.01)

(58) Field of Classification Search
CPC ................ H01C 1/00; H01C 7/13; C22C 9/05
See application file for complete search history.

(56) References Cited

U.S. PATENT DOCUMENTS 4,130,422 A * 12/1978 Wang ................. C22C 33/0207
75/255

FOREIGN PATENT DOCUMENTS

| | | | |
|---|---|---|---|
| DE | 102005015467 * | 2/2024 | .............. C22C 9/00 |
| JP | H08174272 * | 7/1996 | |
| JP | 2007-329421 A | 12/2007 | |
| JP | 2007329421 * | 12/2007 | |
| WO | WO2016/111109 A1 | 7/2016 | |

(Continued)

OTHER PUBLICATIONS

JP-H08174272 translation (Year: 1996).*
(Continued)

*Primary Examiner* — Kyung S Lee
(74) *Attorney, Agent, or Firm* — Crowell & Moring LLP

(57) ABSTRACT

Provided is a current detection resistor, such as a shunt resistor, wherein a. low specific resistance and a small thermal electromotive force with respect to copper are achieved, while maintaining a low TCR. A resistance alloy for use in a current detection shunt resistor includes 4.5 to 5.5 mass % of manganese, 0.05 to 0.30 mass % of silicon, 0.10 to 0.30 mass % of iron, and a balance being copper, and has a specific resistance of 15 to 25 μΩ·m.

5 Claims, 12 Drawing Sheets

(56) References Cited

FOREIGN PATENT DOCUMENTS

| | | | | |
|---|---|---|---|---|
| WO | WO 2019-244842 A1 | | 12/2019 | |
| WO | WO-2019244842 | * | 12/2019 | ............... C22C 9/05 |

OTHER PUBLICATIONS

JP-2007329421 translation (Year: 2007).*
WO-2019244842 translation (Year: 2019).*
DE-102005015467 translation (Year: 2024).*
English translation International Search Report, PCT/ISA/210, and Written Opinion, PCT/ISA/237, in Application No. PCT/JP2021/026813, dated Sep. 7, 2021, 5 pages.

* cited by examiner

RESISTANCE ALLOY FOR USE IN SHUNT RESISTOR, USE OF RESISTANCE ALLOY IN SHUNT RESISTOR, AND SHUNT RESISTOR USING RESISTANCE ALLOY

CROSS-REFERENCE TO RELATED APPLICATIONS

This application is a 371 application of PCT/JP2021/026813 having an international filing date of Jul. 16, 2021, which claims priority to JP2020-145278 filed Aug. 31, 2020, the entire content of each of which is incorporated herein by reference.

TECHNICAL FIELD

The present invention relates to a resistance alloy for use in a shunt resistor, use of a resistance ahoy in a shunt resistor, and a shunt resistor using a resistance alloy.

BACKGROUND ART

Resistance alloys for shunt resistors used for current detection and the like and composed of electrodes and a resistive body include copper-manganese based alloys (such as copper-manganese-nickel alloys), copper-nickel based alloys, nickel-chromium based alloys, and iron-chromium based alloys. For a resistance alloy for shunt resistors, in order to obtain high detection accuracy, copper-manganese based alloys are often used that have a low temperature coefficient of resistance (which may be hereafter referred to as "TCR") and have a small thermal electromotive force with respect to copper. General copper-manganese based alloys (copper-manganese-nickel based alloys) include a copper-manganese-tin based alloy having a specific resistance of 29 μΩ·cm.

Consider designing a small-sized and low-resistance shunt resistor using the resistance alloy. In this case, it is necessary to increase the plate thickness to reduce resistance, which results in a decrease in processability in pressing and the like. On the other hand, if the distance between electrodes is reduced to achieve reduced resistance, the contribution of the TCR of the electrode portions to the entire shunt resistor increases. That is, the TCR of the shunt resistor as a whole (product TCR) increases.

Consider designing a small-sized and low-resistance shunt resistor using a resistance material having a low resistance value, such as a copper-nickel based alloy having a specific resistance of 20 μΩ·cm. In this case, the TCR of the resistance alloy is large, and the product TCR also becomes large. In addition, the thermal electromotive force with respect to copper is also large. Accordingly, as a resistance alloy for a shunt resistor, its uses and use conditions are limited.

CITATION LIST

Patent Literature

Patent Literature 1: JP 2007-329421 A
Patent Literature 2: WO2016/111109 A1

SUMMARY OF INVENTION

Technical Problem

In recent years, there has been a demand for using a current detection resistor for detecting large currents, such as on the order of 1000 A. To address such demand, the resistance value of shunt resistors has been progressively reduced to 100 μΩ, 50 μΩ, 25 μΩ, and 10 μΩ, for example.

Upon constructing a shunt resistor (current detection resistor) using the above resistance alloys, copper electrodes are welded to both ends of a resistive body. Copper has a high TCR of about 4,000 ppm/K (25 to 100° C.). If the shunt resistor is reduced in size or resistance, the percentage of contribution of the TCR of the copper electrodes to the resistance value of the shunt resistor increases. Consequently, the TCR of the shunt resistor increases and the current detection accuracy decreases.

Patent Literature 1 discloses techniques for adjusting the TCR by means of the shape of the resistor. However, processing the electrodes introduces the issue of an increase in the actual resistance of the resistor. Another issue is that it is difficult to perform processing or adjustment when the resistor is reduced in size.

In addition, when the shunt resistor is reduced in resistance and size, another issue is that the TCR of the resistor increases and the detection accuracy decreases. There is also the need to ensure the reliability of the current detection device.

Further, depending on the product specifications, the thickness and width of the shunt resistor may be fixed, in which case the following problems may occur.

FIGS. 10A and 10B show perspective views of shunt resistors in which the inter-electrode distance is changed. Herein, a raised structure in which the resistive body is raised relative to the electrode ends will be described by way of example. FIG. 10A is a perspective view of a configuration example of a shunt resistor in a shunt resistor X1, wherein a distance (inter-electrode distance=length of the resistive body 111) L103 between electrodes 1115*a*, 115*b* connected to wires 121*a*, 121*b* is reduced. FIG. 10B is a perspective view of a configuration example of a shunt resistor in a shunt resistor X2, wherein an inter-electrode distance (length of the resistive body) L113 between the electrodes 115*a*, 115*b* connected to the wires 121*a*, 121*b* is increased. L101, L102, L111, and L112 are the widths corresponding to the widths that can be changed in the respective shunt resistors.

For the following description, reference is made to FIGS. 10A and 10B. FIG. 10A and FIG. 10B are also used for describing the following embodiments of the present invention.

1) When the size of the electrodes of the shunt resistor is constant, if the resistance value of the shunt resistor is to be reduced, it is necessary to increase the thickness of the resistive body. However, if the plate thickness of the resistive body is large, problems may occur, such as a drooping of the cut portion or the inability to maintain a clean shape thereof when pressing (punching) or the like is performed.

2) Compared to the shunt resistor structure illustrated in FIG. 10B, where the inter-electrode distance L113 is large (electrode widths L111, L112 of the raised portion are relatively small), by relatively increasing the electrode widths L101, L102 of the raised portions of the electrodes and by reducing the inter-electrode distance L103 (reducing the length of the resistive body 111) as illustrated in FIG. 10A, it is possible to reduce the resistance value of the shunt resistor X1. Thus, a shunt resistor having a low resistance value can be achieved. However, because the lengths of the electrodes 115*a*, 115*b* become large relative to the length of the resistive body 111, the TCR of the shunt resistor X1 increases due to the influence of the TCR of the electrode material, i.e., copper. That is, in the structure of FIG. 10A, compared to the structure of FIG. 10B, the copper electrodes 115*a*, 115*b* are larger relative to the resistive body 111, as indicated by the arrows. This results in an issue of a greater TCR.

Further, as illustrated in FIG. 10A, when the length L103 of the resistive body 111 is reduced, welding of the resistive body 111 and the electrodes 115*a*, 115*b* becomes more difficult. Accordingly, there is a limit to lowering the resistance of the shunt resistor X1. That is, since welding requires a certain width margin, if the length of the resistive body 111 is reduced too much, the actual resistive body portion becomes too small. For instance, when a resistive body and an electrode is to be welded by electron beam welding or the like, it is necessary to take the width of a weld mark into consideration. Thus, there is a processing dimensional limitation in the process of reducing the length of the resistive body.

3) As another means for reducing the resistance value of the shunt resistor, it may be contemplated to reduce the specific resistance of the resistive body alloy the resistive body is composed of.

For example, as a resistive body alloy enabling a decrease in TCR and specific resistance, there is a Cu—7Mn—2.3Sn alloy. The specific resistance is 29 μΩ·cm, which cannot be said to be sufficiently low. As a resistance alloy having a specific resistance of 20 μΩ·cm, there is a Cu—Ni based alloy. This, however, has TCR perfbrmance of approximately 330 ppm/K, which is not very good. Additionally, the thermal electromotive force with respect to copper is large and has a large influence on current detection accuracy.

Patent Literature 2 discloses a resistance alloy composed of a Cu alloy containing Cu, no less than 6.20 mass % and no more than 7.40 mass % of Mn, and no less than 0.15 mass % and no more than 1.5 mass % of Si, the resistance alloy having a TCR absolute value no more than 15 ppm/K from 25° C. to 150° C.

This makes it possible to reduce the absolute value of the TCR in a wide temperature range. However, Patent Literature 2, while achieving a low TCR, does not disclose that specific resistance and thermal electromotive force with respect to copper are also reduced. This point will be discussed below.

It is an objective of the present invention to achieve a low specific resistance and a small thermal electromotive force with respect to copper in a resistor for current detection, such as a shunt resistor, while maintaining a low TCR.

Another objective is to provide a resistance alloy for use in such a shunt resistor.

Solution to Problem

According to an aspect of the present invention, there is provided a copper-manganese based resistance alloy for use in a current detection shunt resistor, the resistance alloy including 4.5 to 5.5 mass % of manganese, 0.05 to 0.30 mass % of silicon, 0.10 to 0.30 mass % of iron, and a balance being copper, and having a specific resistance of 15 to 25 μΩ.

A resistance alloy is characterized by a TCR less than or equal to $100\times10^{-6}$/K (range of 0 to $100\times10^{-6}$).

A resistance alloy according to one of the above is characterized by a thermal electromotive force with respect to copper within ±1 μV/K.

In this way, it is possible to achieve reductions in TCR and thermal electromotive force with respect to copper while reducing the value of the TCR of a shunt resistor formed with copper electrodes.

The present invention also provides use of the resistance alloy according to one of the above in a resistive body of a shunt resistor for use in a current detection device.

The present invention also provides a current detection shunt resistor comprising a resistive body and an electrode, the resistive body being formed of a resistance alloy including 4.5 to 5.5 mass % of manganese, 0.05 to 0.30 mass % of silicon, 0.10 to 0.30 mass % of iron, and a balance being copper, and having a specific resistance of 15 to 25 μΩ.

The present invention also provides a current detection shunt resistor comprising a resistive body and an electrode, the resistive body being formed of a resistance alloy including 4.5 to 5.5 mass % of manganese, 0.05 to 0.30 mass % of silicon, 0.10 to 0.30 mass % of iron, and a balance being copper, and having a specific resistance of 15 to 25 μΩ.

The present description includes the contents disclosed in JP Patent Application No. 2020-145278, based on which the present application claims priority.

Advantageous Effects of Invention

By using the resistance alloy of the present invention, it is possible to achieve a low specific resistance and a small thermal electromotive force with respect to copper in a shunt resistor for use in a current detection device, while reducing the TCR thereof.

Further, by using the resistance alloy of the present invention, it is possible to ensure current detection reliability of the shunt resistor.

BRIEF DESCRIPTION OF DRAWINGS

In FIG. 8B, dimensions (mm) are shown.

DESCRIPTION OF EMBODIMENTS

The inventors, by additionally including an appropriate amount of Fe in a resistance material using a Cu—Mn—Si based alloy such as described in Patent Literature 2, can achieve a low specific resistance (such as 15 to 25 μΩ·cm) while keeping a low TCR (such as less than or equal to $100\times10^{-6}$/K).

Further, the composition and the like may be adjusted to have a small thermal electromotive force with respect to copper.

In the following, resistance alloys for use in shunt resistors according to the embodiments of the present invention, and a shunt resistor using the same, for example, will be described with reference to the drawings.

First, the inventors' considerations concerning the present invention will be briefly explained.

1) As the focus of the inventors, it is important to mix and use a resistance alloy that shows a negative TCR in the resistive body, to compensate for the contribution of the large positive TCR of copper used in the electrodes. However, there are few reports concerning resistance alloys having a large negative TCR.

2) While copper-nickel alloys having low TCR and excellent long-term stability are present, such alloys have a large thermal electromotive force of 40 μV/K with respect to copper. Thus, in a shunt resistor for use in a current detection device with large current flows, the detection accuracy decreases due to the Peltier effect.

3) As an example of an alloy having a negative TCR, there is a nickel-chromium based alloy. However, the nickel-chromium based alloy has a specific resistance greater than or equal to two-fold compared to copper-nickel alloys and copper-manganese alloys. Accordingly, it is difficult to achieve a reduced resistance of the shunt resistor.

In the present embodiment, a resistance alloy for a resistive body that makes it possible to achieve a low specific resistance (such as 15 to 25 μΩ·cm) is provided.

Further, the results of adjustment of the alloy composition and the like to have a low TCR (less than or equal to $100\times10^{-6}$/K) and a sufficiently small thermal electromotive force with respect to copper (less than or equal to 1.0 μV/K) are indicated.

First Embodiment

An embodiment of the present invention will be described below in concrete terms.

An alloy of the present embodiment is a resistance alloy having a low TCR, and is a quaternary alloy composed of copper-manganese-silicon-iron. The resistance alloy can be used as the resistance material of a shunt resistor.

Figure 1:
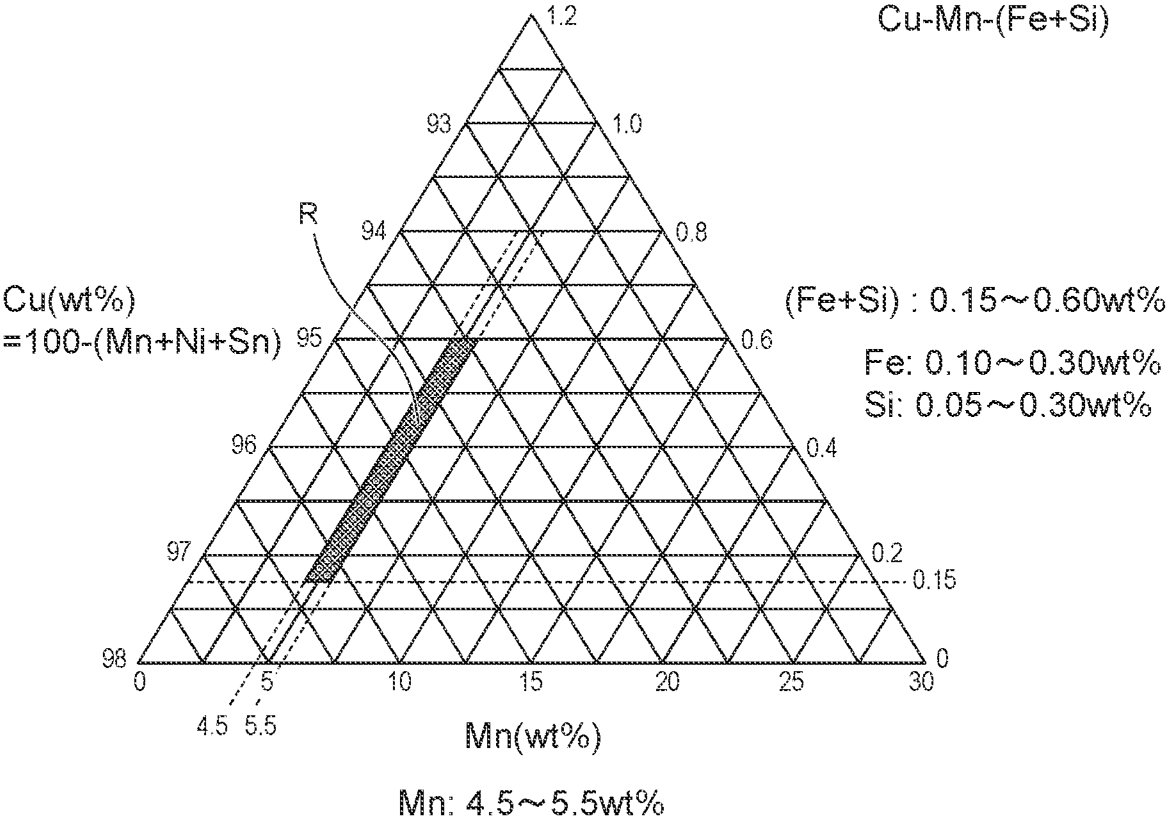
FIG. 1 is a phase diagram of a quaternary alloy of a resistance alloy for a resistive body including copper and manganese-iron-silicon according to the present embodiment.

FIG. 1 is a phase diagram of the quaternary alloy of the alloy for a resistive body including copper-manganese-silicon-iron according to the present embodiment.

Herein, the mass fraction of copper is shown on the axis on the upper-left side, and the mass fraction of silicon+iron is shown on the axis on the upper-right side. Meanwhile, the mass fraction of manganese is shown on the axis on the bottom side.

FIG. 1 shows a filled region R characterizing the resistance alloy of the present invention. In the region R, the mass fraction of manganese is 4.5% to 5.5%. In the region R, the mass fraction of silicon+iron is 0.15% to 0.60%. More specifically, silicon has a mass fraction of 0.05% to 0.30%, and iron has a mass fraction of 0.10% to 0.30%. The balance is copper.

A representative value of manganese is 5.0 mass %. A representative value of silicon is 0.15 mass %. A representative value of iron is 0.2 mass %. The balance is copper.

Figure 2:
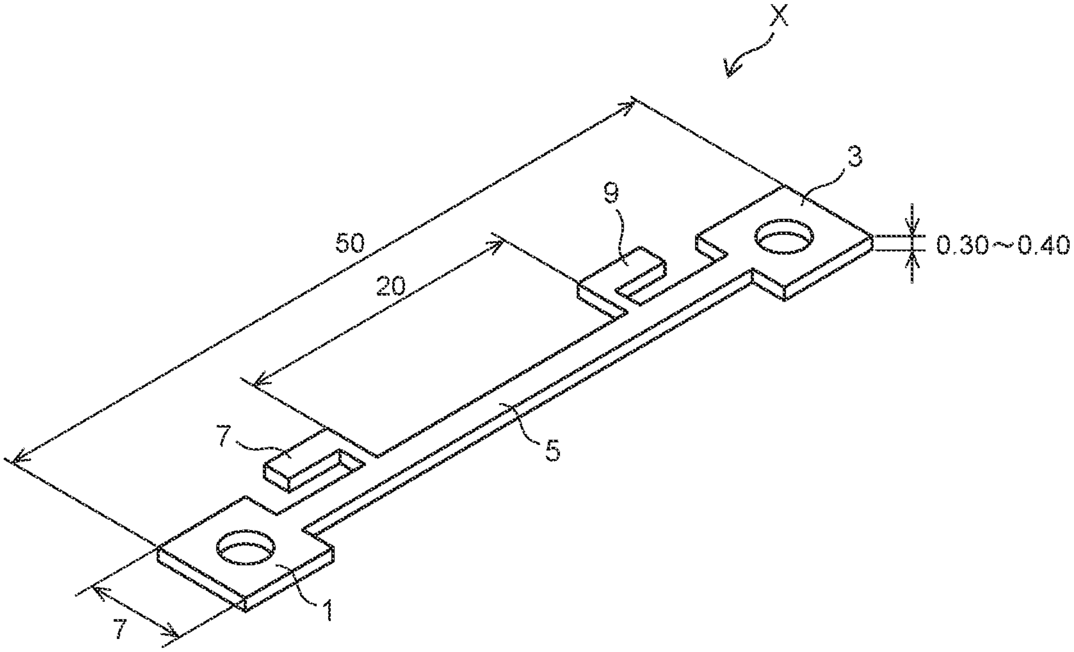
FIG. 2 is a diagram illustrating the shape of an evaluation element for a resistance alloy for a resistor according to the present embodiment.

FIG. 2 illustrates the shape of an evaluation element for the alloy for a resistor according to the embodiment of the present invention.

As illustrated in FIG. 2, the evaluation element X for the alloy for a resistor includes electrode portions (through which current flows) 1, 3 on both ends, a resistive body 5 extending between the electrode portions 1, 3, and voltage detection portions 7, 9 which are positioned closer to the center than the ends of the resistive body 5 are. The distance between the electrode portions 1, 3 is 50 mm, and the distance between the voltage detection portions 7, 9 is 20 mm.

Next, an example of an evaluation sample manufacturing process will be briefly described:

1) Raw materials are weighed.
2) The materials of 1) are dissolved.
3) Using a cold rolling mill, a hoop material of a predetermined thickness is obtained.
4) In a vacuum gas replacement furnace, heat treatment is performed in an $N_2$ atmosphere at 500 to 700° C. for 1 to 2 hours.
5) From the hoop material, an evaluation element with the shape shown in FIG. 2 is prepared by pressing.
6) In the vacuum gas replacement furnace, heat treatment (low temperature heat treatment) is performed in an $N_2$ atmosphere at 200 to 400° C. for 1 to 4 hours.

The mass fraction of each of the alloy components in the region R is adjusted with respect to each other such that the resistance alloy has the following characteristics (appropriate conditions).

Appropriate Conditions

1) The specific resistance is greater than or equal to 15 μΩ·cm and less than or equal to 25 μΩ·cm.

2) The TCR with reference to 25° C. is less than or equal to $100\times10^{-6}$/K (from 0 to approximately $100\times10^{-6}$/K) at 100° C.

3) Thermal electromotive force with respect to copper is within ±1 0 μV/K.

Thus, in the present invention, in order to solve the problems, a resistance alloy is provided that has a low specific resistance (about 20 μΩ·cm: in a range of 15 to 25 μΩ·cm), a low TCR (less than or equal to $100\times10^{-6}$/K), and a small thermal electromotive force with respect to copper (within ±1 μV/K).

As used herein, the term "small-sized" with reference to a shunt resistor means those with a chip size of less than or equal to 6.3×3.1 mm. Also, the term "low resistance" means that the resistance of the product is 0.5 mΩ or less.

Detailed Description Regarding Resistance Alloy Sample

Various resistance alloys were prepared as shown below. The compositions and characteristics of the resistance alloys are shown in Table 1.

TABLE 1

| | Composition (mass %) | | | | Specific resistance | TCR (100° C./25° C.) | Thermal electromotive force with respect to copper (0-100° C.) |
|---|---|---|---|---|---|---|---|
| | Cu | Mn | Fe | Si | (μΩ · cm) | ($\times10^{-6}$/K) | (μV/K) |
| Example 1 | Bal. | 5 | 0.2 | 0.1 | 20.0 | 84 | 0.11 |
| Example 2 | Bal. | 5 | 0.2 | 0.2 | 20.8 | 77 | 0.09 |
| Sample 1 | Bal. | 4.5 | 0 | 0 | 17.2 | 132 | 0.87 |
| Sample 2 | Bal. | 5 | 0 | 0 | 18.9 | 99 | 0.95 |
| Sample 3 | Bal. | 5.5 | 0 | 0 | 20.7 | 76 | 1.04 |
| Sample 4 | Bal. | 5 | 0.2 | 0 | 19.9 | 87 | −0.32 |
| Sample 5 | Bal. | 5 | 0.5 | 0 | 20.9 | 76 | −1.06 |
| Sample 6 | Bal. | 5 | 1 | 0 | 21.2 | 82 | −1.43 |
| Sample 7 | Bal. | 5 | 0 | 1 | 26.9 | 43 | −0.50 |
| Comparative example 1 (Cu-Ni alloy) | Cu-14Ni | | | | 20 | 325 | −27 |
| Comparative example 2 (Cu-Mn-Sn alloy) | Cu-7Mn-2.3Sn | | | | 29 | −2 | 0.10 |

Table 1 shows the compositions ant electrical characteristics (specific resistance, TCR, and thermal electromotive force with respect to copper) of the resistance alloys (Examples 1 and 2) according to the present embodiment and the resistance alloys including Comparative Example 1 (Cu—14Ni) and Comparative Example 2 (Cu—Mn—Sn alloy). Table 1 further includes Sample 1 to Sample 7 for the purpose of verifying and determining a composition range (content range) of the resistance alloy of the present invention.

With respect to the specific resistance of the resistance material, for the samples of Examples 1, 2, values (15 to 25 μΩ·cm) equivalent to those of Comparative Examples 1, 2, which are commercially available materials, were obtained. The thermal electromotive force with respect to copper (0 to 100° C.) is less than or equal to 0.2 μV/K, and sufficiently satisfies the appropriate condition.

By considering the data of Table 1, particularly the values of Examples 1, 2 and Samples 1 to 7, the following can be seen.

1) Maintaining a Low Specific Resistance while Adjusting Other Performances

Compared to the results for Samples 1 to 3 that include neither Fe nor Si, the CuMn alloy makes it possible to achieve the appropriate conditions (characteristics requirements) with respect to the specific resistance and TCR characteristics of the present invention. However, the thermal electromotive force with respect to copper may exceed 1 μV/K. Accordingly, it is necessary to add an element that lowers the thermal electromotive force with respect to copper, without adversely affecting (increasing) the TCR.

2) Regarding Improvements of TCR and the Like, and Influence of Addition of Fe

If another element, such as Fe herein, is added to the CuMn alloy, the TCR decreases but the specific resistance tends to increase. Accordingly, in order to evaluate the effect of decreasing the TCR, it is necessary to consider both the specific resistance and the TCR.

Figure 3:
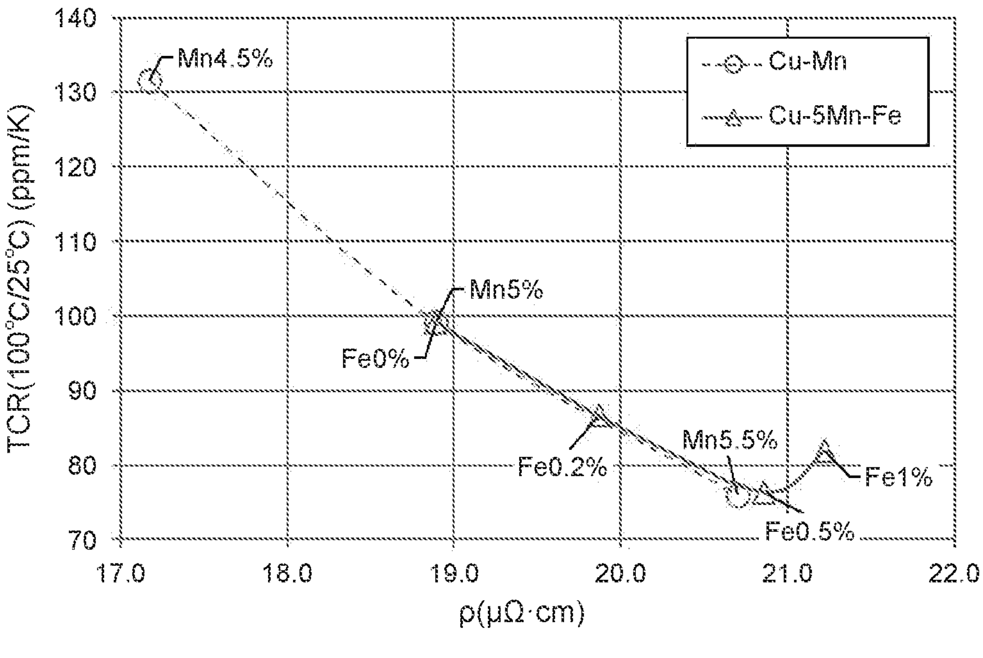
FIG. 3 is a chart illustrating relationship between the specific resistance and TCR of the resistance alloy according to the present embodiment, indicating values corresponding to Sample 1 to Sample 6 of Cu—Mn alloys (including samples having Fe added thereto) of Table 1.

FIG. 3 is a chart illustrating relationship between the specific resistance and TCR of the Cu—Mn based alloys. Values corresponding to Sample 1 to Sample 6 of the Cu—Mn alloys of Table 1 (including samples having Fe added thereto) are shown.

FIG. 3 shows the values for the Cu—Mn alloys and Cu—5Mn—Fe alloys. In the figure, each plot indicates the compositions of Mn and Fe by numerical values.

As illustrated in FIG. 3, it can be seen that, in the Cu—Mn alloys, the TCR can be gradually reduced as the Mn composition increases to 5.0 mass % and to 5.5 mass %.

Further, in the Cu—5Mn—Fe alloys, it can be evaluated that the TCR increases (deteriorates) as the Fe composition increases. In particular, the TCR sharply increases as the Fe composition exceeds 0.5 mass % and reaches 1.0 mass %.

Note, however, that the TCR does not sharply increase as long as the Fe composition is less than 0.5 mass %, such as about 0.2 mass %.

In any of the ranges, the TCR is less than or equal to $100\times10^{-6}$/K.

Figure 4:
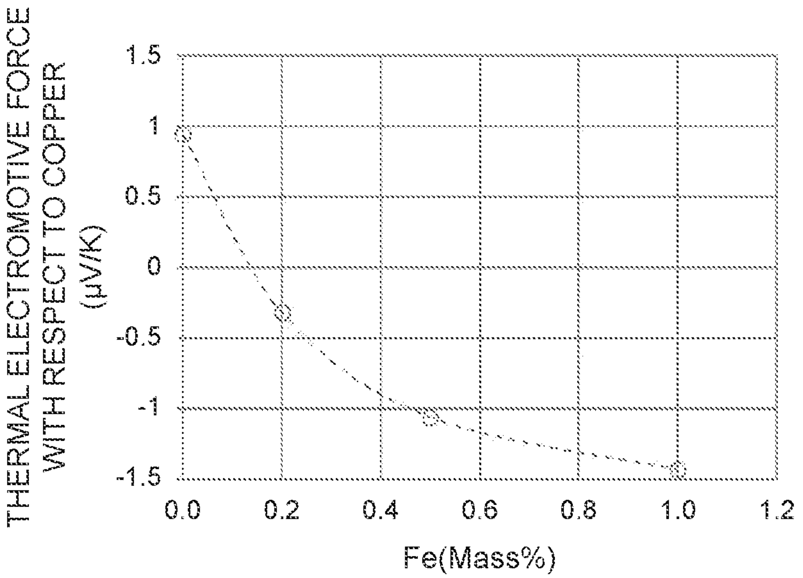
FIG. 4 is a chart illustrating relationship between the composition of Fe and the thermal electromotive force with respect to copper of the resistance alloy according to the present embodiment, indicating values corresponding to Sample 2 and Samples 4-6 of the Cu—Mn alloys of Table 1 (including samples having Fe added thereto).

FIG. 4 is a chart illustrating relationship between the Fe composition and the thermal electromotive force with respect to copper. Values corresponding to Sample 2 and Samples 4-6 of the Cu—Mn alloys (including samples having Fe added thereto) of Table 1 are shown.

As will be seen from Sample 4 (Fe: 0.2 mass %), even if the amount of Fe added is small, there is the effect of greatly lowering the thermal electromotive force with respect to copper. Further, it can be seen that, from the values of Samples 2 and 4-6, by adding 0.1 to 0.3 mass % of Fe, the thermal electromotive force with respect to copper falls within the range of about ±0.5 μV/K. In addition, as will also be seen from FIG. 3 described above, the effect of Fe addition with respect to the TCR is such that the TCR can be made less than or equal to $100\times10^{-6}$/K if the amount of Fe added is up to 0.5 mass %, in view of the results for Samples 2 and 4-6.

Thus, in the Cu—Mn alloys, if the resistance alloy has 0.10 to 0.30 mass % of iron added thereto, the thermal electromotive force with respect to copper can be kept within ±1 μV/K and the TCR less than or equal to $100\times10^{-6}$/K.

3) Regarding Influence of Si Addition

If the composition of the Cu—Mn based alloy material is nearly 100% Cu, it can be expected that oxidation of Cu will become a problem. Accordingly, it is also important to suppress oxidation of Cu.

Using the evaluation element of FIG. 2, a heat resistance test was performed on the samples of Examples 1, 2 and on Sample 4 of Table 1 (the samples of Examples 1, 2 having Si added thereto).

Figure 5:
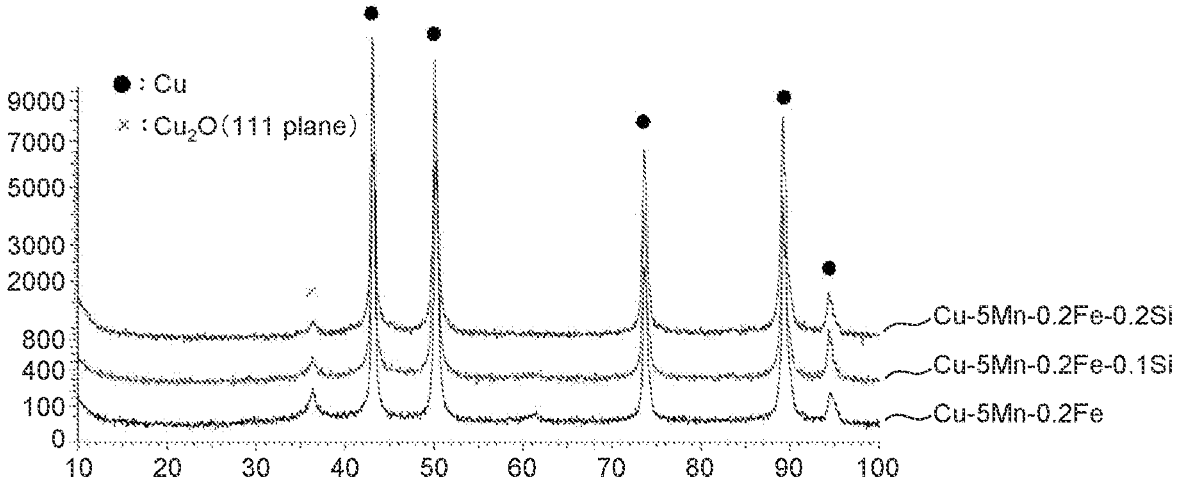
FIG. 5 is a chart illustrating results of analysis by an X-ray diffractometer (XRD) in the cases where Si was added to the resistance alloys during a high temperature storage test performed with the evaluation element illustrated in FIG. 2.

FIG. 5 is a chart illustrating results of analysis of Si addition by an X-ray diffractometer (XRD), showing the results of measurement of the samples 3000 hours after a high emperature storage test at 175° C. In sequence from the top of FIG. 5, the measurement results for Example 2, Example 1, and Sample 4 are shown.

Figure 6:
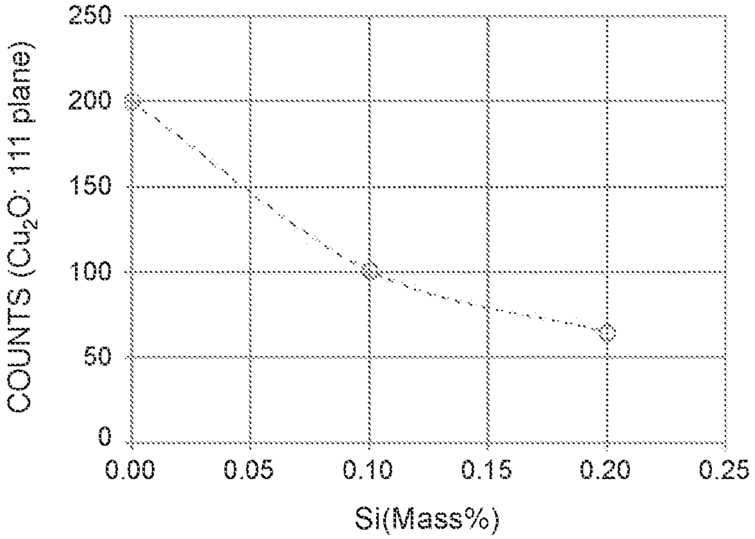
FIG. 6 is a chart examining the influence of addition of Si when a high temperature storage test was performed with the evaluation element illustrated in FIG. 2, illustrating relationship between the amount of Si added and the diffraction intensity (vertical axis: counts) at the 111 plane of $Cu_2O$.

FIG. 6 is a chart illustrating the amount of Si added and the Si composition. dependency of the diffraction intensity at the 111 plane of $Cu_2O$ (vertical axis: counts) when a similar high temperature storage test was conducted.

It can be seen from the XRD data (FIG. 5, FIG. 6) after the high temperature storage test that the generation of $Cu_2O$ is suppressed by the addition of Si. That is, the peak of $Cu_2O$ (indicated by "×" in FIG. 5) decreases as the amount of Si added increases. Note that "●"s are the peaks of Cu indicated as references.

This phenomenon is presumed to be based on the Cu-oxidation suppressing effect due to an Si oxide being formed on the material surface of the resistance alloy by the addition of Si.

Figure 7:
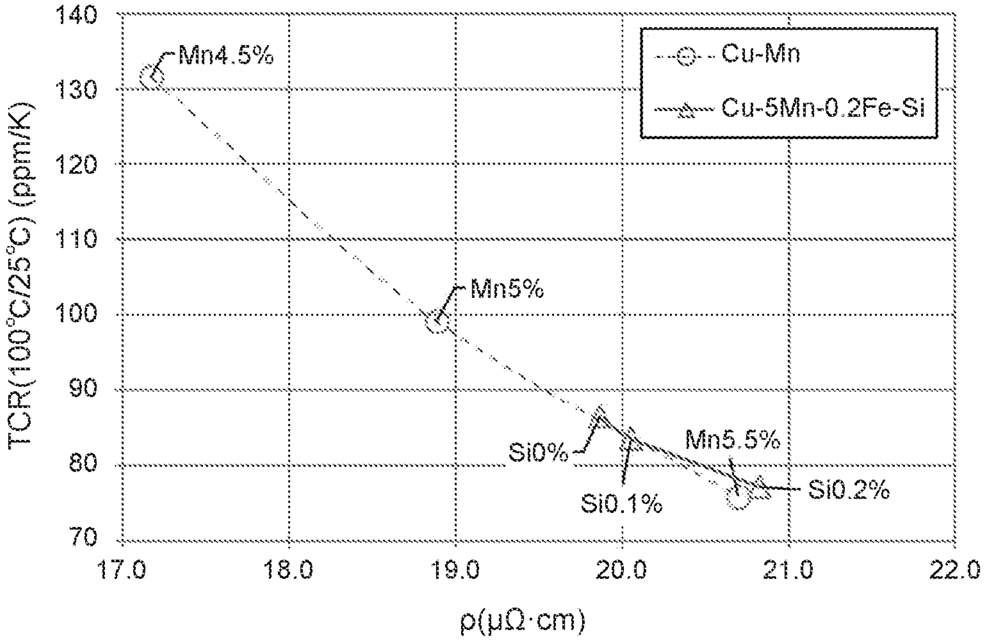
FIG. 7 is a chart illustrating relationship between the TCR and specific resistance of the resistance material of the resistance alloy according to the present embodiment.

FIG. 7 is a chart illustrating relationship between the TCR and specific resistance of the resistance material, showing characteristics corresponding to FIG. 4. FIG. 7 shows the values for Cu—Mn and Cu—5Mn—0.2Fe—Si (Sample 4, Example 1, Example 2).

As illustrated in FIG. 7, with regard to the influence on the TCR, it can be seen that, from the results for Examples 1, 2 and Sample 4, the TCR does not become high as long as the amount of Si added is about 0.2 mass %. Based on experiments and the like conducted by the inventors, the amount of Si added is preferably in the range of 0.05 to 0.30 mass %.

Detailed Description of the Effectiveness of the Present Invention

In the following, the effectiveness of the present invention is described in detail.

The present invention provides a resistance alloy for a current detection shunt resistor, the resistance alloy having 4.5 to 5.5 mass % of Mn, 0.10 to 0.30 mass % of Fe, 0.05 to 0.30 mass % of Si, and the balance being Cu.

The resistance alloy has a specific resistance in the range of 15 to 25 μΩ·cm.

Further, the resistance alloy has a TCR less than or equal to $100\times10^{-6}$/K (25-100° C.).

Further, the resistance alloy has a thermal electromotive force with respect to copper within ±1 μV/K.

With such characteristics, the resistance alloy is suitable for a small-sized and low-resistance shunt resistor, and a low TCR value can also be achieved. The current detection accuracy of a current detection device using the shunt resistor is improved, and the space required for the current detection device can be reduced by a reduction in size of the shunt resistor.

Second Embodiment

Figure 8A:
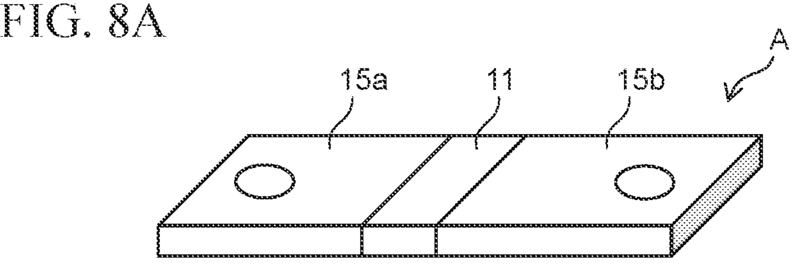
FIG. 8A is a perspective view of a configuration example of a shunt resistor using the alloy for a resistor according to a second embodiment of the present invention.
Figure 8B:
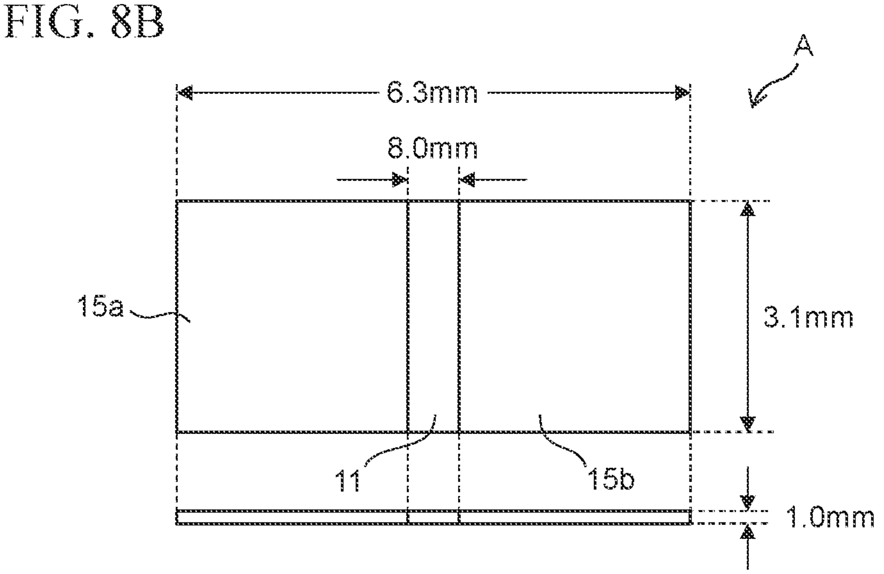
FIG. 8B shows a plan view and a side view of the shunt resistor.

Next, a second embodiment of the present invention will be described. FIG. 8A is a perspective view of a configuration example of a shunt resistor using the alloy for the resistor according to the second embodiment of the present invention. FIG. 8B shows a plan view and a side view of the shunt resistor. In FIG. 8B, dimensions (mm) are shown.

The shunt resistor A illustrated in FIGS. 8A and 8B have a structure obtained by preparing a single unitary piece of a resistive body 11 by pressing and the like, and then butt-welding Cu electrodes 15*a*, 15*b* onto the ends thereof.

The resistive body 11 and the electrodes 15*a*, 15*b* may be joined by electron beam (EB) welding, laser beam (LB) welding, and the like. The shunt resistor A illustrated in FIGS. 8A and 8B is a relatively large shunt resistor, and may be made one by one. The material of the resistive body may be the one described with reference to the first embodiment, including 4.5 to 5.5 mass % of manganese, 0.10 to 0.30 mass % of iron, 0.05 to 0.30 mass % of silicon, and the balance being copper. Other alloys described in the first embodiment may be used depending on the purpose.

To confirm the effect of using the resistance alloy of the present invention in a shunt resistor product, a shunt resistor was fabricated using the resistive body of each of Example 1 and Comparative Example 2.

TABLE 2

| | Size | | | | | |
|---|---|---|---|---|---|---|
| | Overall length (mm) | Overall width (mm) | Resistive body length (mm) | Resistive body thickness (mm) | Resistance value (mΩ) | TCR (100° C./25° C.) (ppm/K) |
| Resistor using Comparative example 2 | 6.3 | 3.15 | 2 | 1 | 0.2 | 310 |

TABLE 2-continued

| | Size | | | | | |
|---|---|---|---|---|---|---|
| | Overall length (mm) | Overall width (mm) | Resistive body length (mm) | Resistive body thickness (mm) | Resistance value (mΩ) | TCR (100° C./25° C.) (ppm/K) |
| Resistor using material of Example 1 | 6.3 | 3.15 | 3 | 1 | 0.2 | 240 |

Table 2 compares Comparative Example 2 and Example 1, and shows size, resistance value, and TCR.

The outer size of the shunt resistor was 6.3 mm×3.1 mm, the thickness of the resistive body was 1 mm, and the rated resistance value of the shunt resistor was 0.2 mΩ.

Figure 10A:
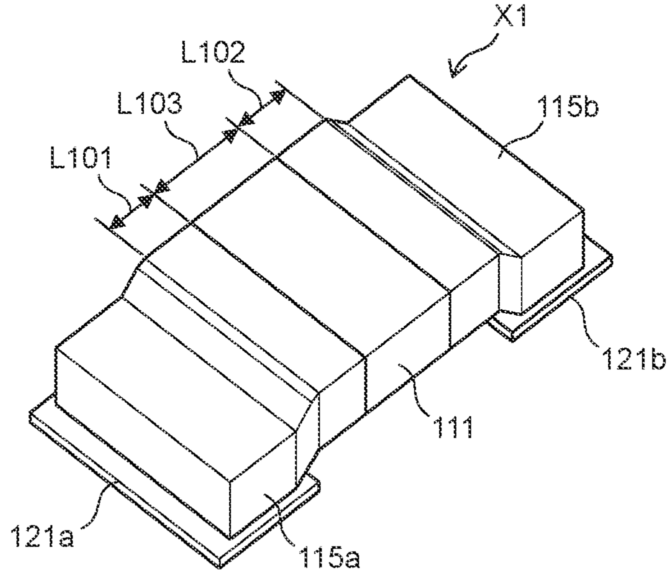
FIGS. 10A and 10B show perspective views in which the inter-electrode distance of the shunt resistor is changed.
Figure 10B:
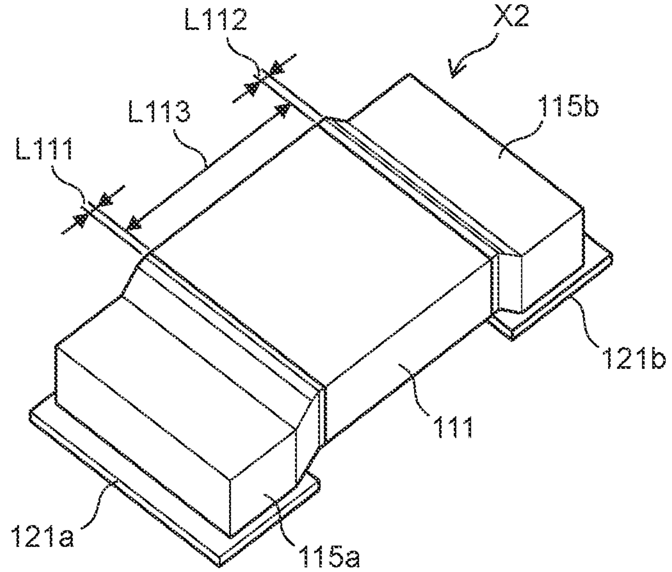

As shown in Table 2, in the shunt resistor using the resistance alloy of Example 1, compared to when the resistance alloy of Comparative Example 2 is used, the specific resistance can be reduced, although the rated resistance value is the same. Accordingly, the length of the resistive body can be increased from 2 mm to 3 mm. Thus, the TCR can be reduced as described with reference to FIG. 10A.

In the shunt resistor according to the present embodiment, freedom of design of the shunt resistor can be ensured by using a resistive body having a relatively high specific resistance.

Further, by using the resistance alloy having a relatively high specific resistance, the contribution of the TCR of Cu used in the electrodes relative to the entire resistor can be reduced. Accordingly, a shunt resistor taking advantage of the characteristics of the resistance alloy can be provided.

Herein, in the present embodiment, the TCR of the resistance material is adjusted to be on the negative side. Thus, the TCR of the resistor to which the copper electrodes have been joined can be reduced.

For the shunt resistor A structured and dimensioned as illustrated in FIG. 8B, the TCR was measured. For the shunt resistor in which Comparative Example 1 was used as the resistance material, the TCR was 76 ppm/K. On the other hand, for the shunt resistor in which Sample 1 was used, the TCR was 50 ppm/K. Thus, it can be seen that the TCR is improved toward zero when the resistance alloy of the present embodiment is used.

Third Embodiment

Next, a third embodiment of the present invention will be described. This is an example of manufacture in which an elongated joined material comprising a resistive body and electrodes joined together is prepared and then punched and cut. In this way, it is possible to mass-produce relatively small-sized shunt resistors.

In the following, an example of such manufacturing process is described. FIG. 9A to FIG. 9F illustrate an example of the manufacturing process for a shunt resistor according to the present embodiment.

Figure 9A:
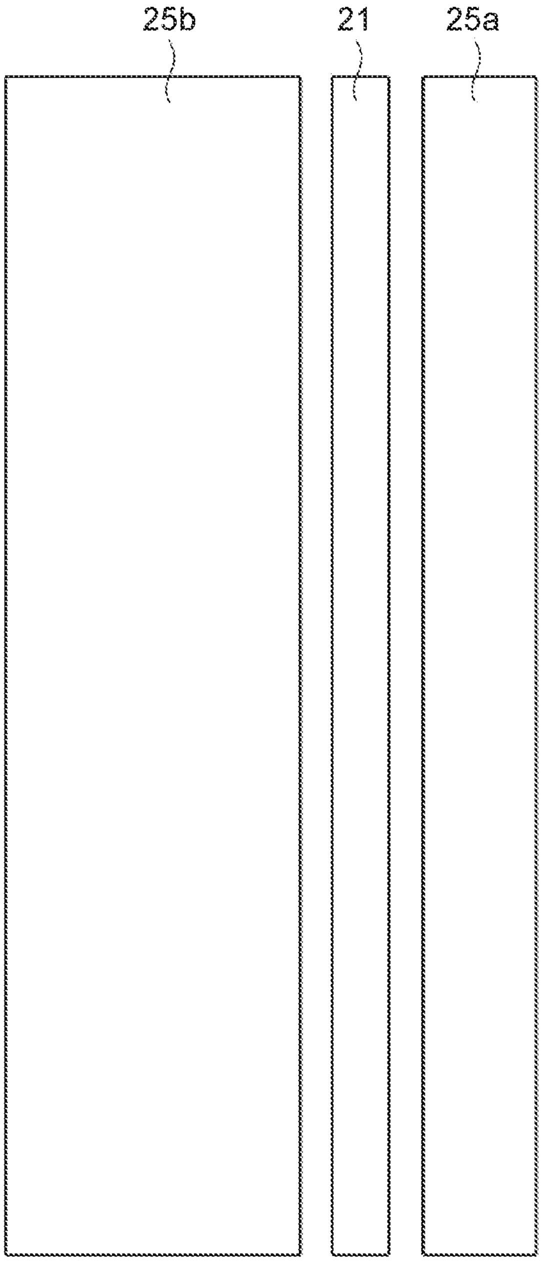
FIG. 9A illustrates an example of a manufacturing step for a shunt resistor according to a third embodiment of the present invention.

As illustrated in FIG. 9A, for example, an elongated resistance material 21 of a flat plate-like shape, and a first electrode material 25*a* and a second electrode material 25*b* of an elongated flat plate-like shape similar to the resistance material 21 are prepared. For the resistance material 21, an alloy material described in the first or second embodiment is used.

Figure 9B:
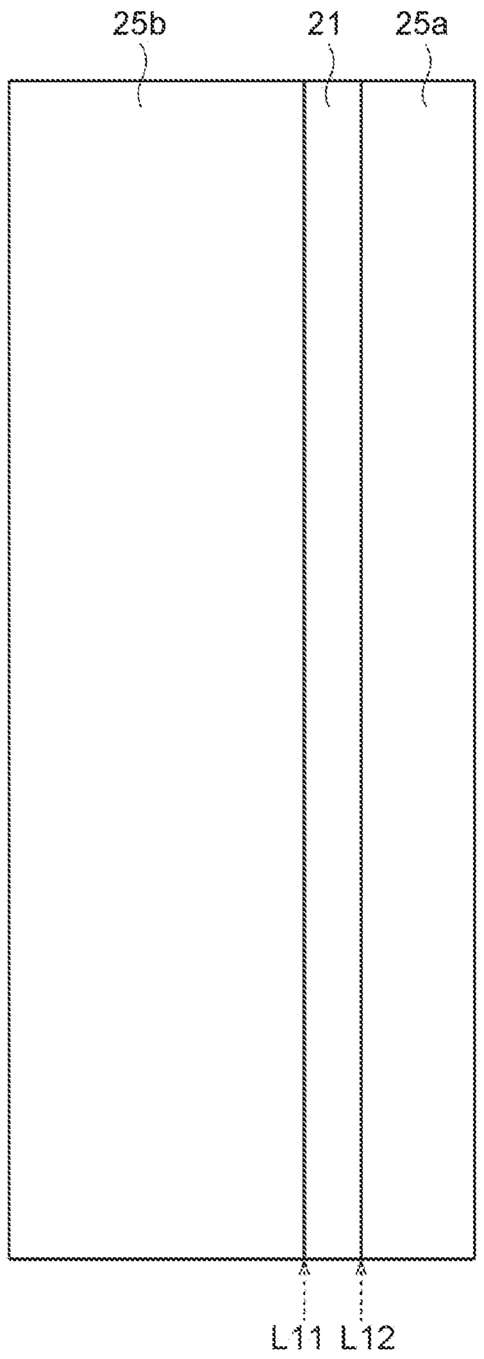
FIG. 9B illustrates an example of a manufacturing process for the shunt resistor according to the third embodiment of the present invention, continuing from FIG. 9A.

As illustrated in FIG. 9B, the first electrode material 25*a* and the second electrode material 25*b* are arranged on both sides of the resistance material 21.

Figure 9C:
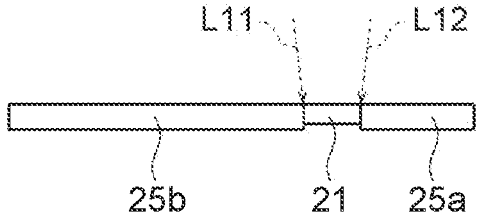
FIGS. 9CA and 9CB illustrate an example of a manufacturing process for the shunt resistor according to the third embodiment of the present invention, continuing from FIG. 9B.
Figure 9C:
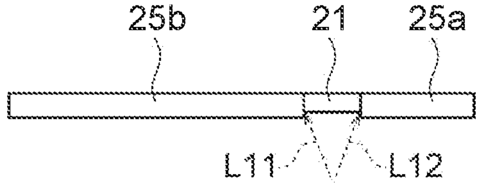

As illustrated in FIG. 9C, welding is performed using an electron beam, a laser beam or the like to obtain a single piece of flat plate (joined at L11 and L12). Specifically, the electron beam or the like irradiates locations illustrated in FIG. 9CA or FIG. 9CB. FIG. 9CA is an example in which the electron beam or the like irradiates a flat surface side of the electrode material 25*a*, 25*b* and the resistive body 21. FIG. 9CB is an example in which the electron beam or the like irradiates the inside of a recess formed by the electrode material 25*a*, 25*b* and the resistive body 21. The surfaces of the electrode material 25*a*, 25*b* protruding beyond the resistive body 21 are prevented from being irradiated with the electron beam or the like so as to be less affected.

The resistance value may be adjusted by the difference in thickness of the resistance material 21 and the electrode material 25*a*, 25*b*. Further, a step ($\Delta h_2$) may be formed, as will be described below with reference to FIG. 9F. It is also possible to make various adjustments regarding the resistance value and shape by means of the joining position.

Figure 9D:
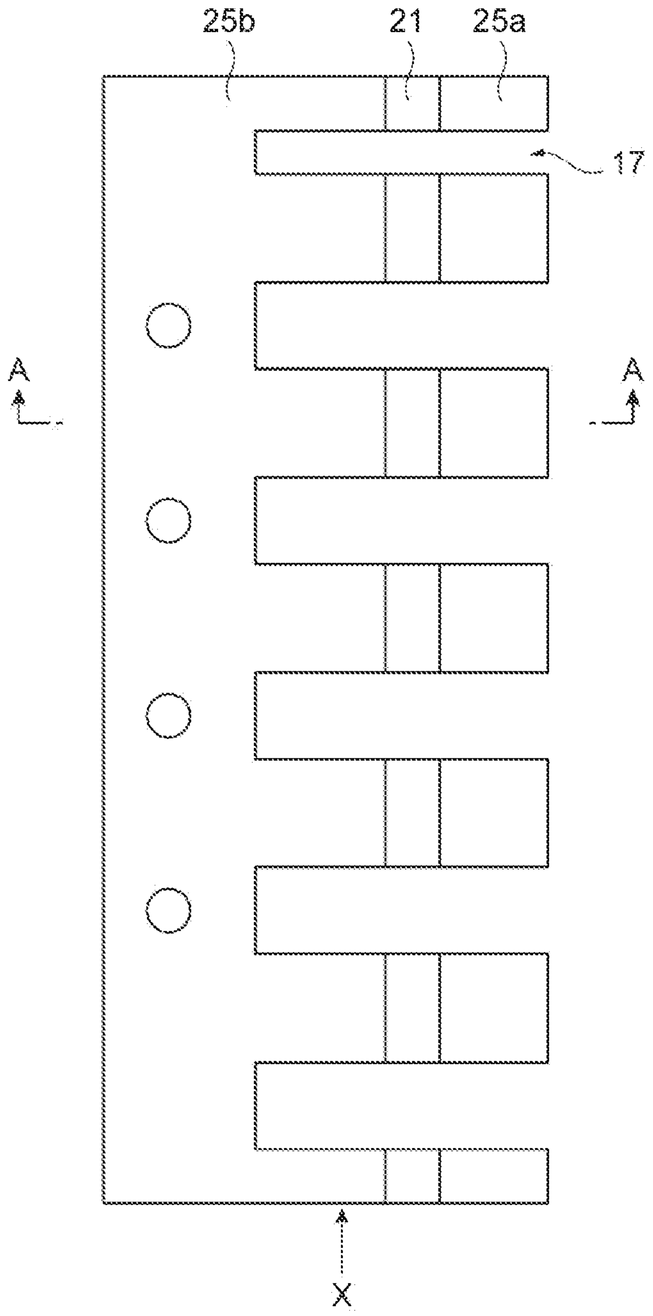
FIGS. 9DA and 9DB illustrate an example of a manufacturing process for the shunt resistor according to the third embodiment of the present invention, continuing from FIGS. 9CA and 9CB.
Figure 9D:
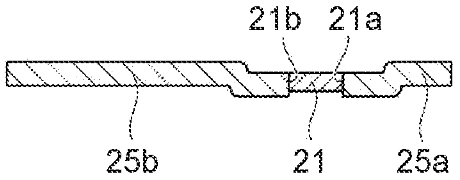

Next, as illustrated in FIG. 9DA, from the state of FIG. 9B, the flat plate including the region of the resistive body 21 is punched out in a comb shape, as indicated at sign 17. Then, the first electrode material 25*a* and the second electrode material 25*b* are partly bent by pressing or the like, forming a structure with a cross sectional shape shown in the cross-sectional view of FIG. 9DB. Signs 21*a*, 21*b* indicate welded portions where connections are made by electron beam irradiation or the like.

Figure 9E:
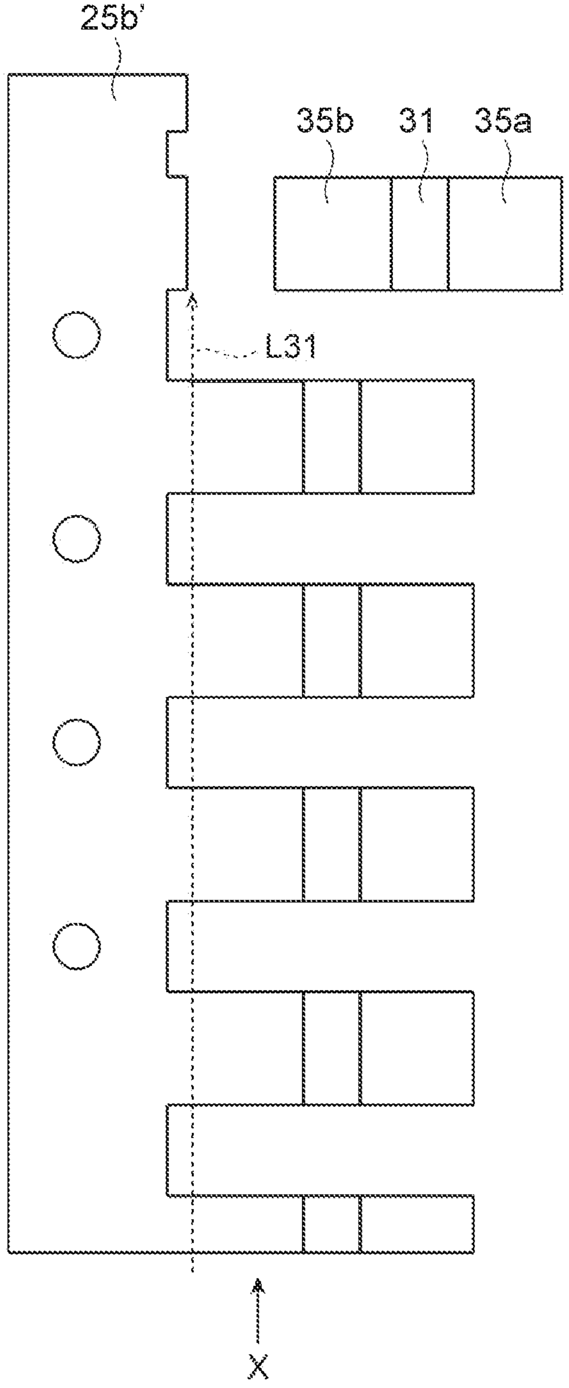
FIG. 9E illustrates an example of a manufacturing process for the shunt resistor according to the third embodiment of the present invention, continuing from FIGS. 9DA and 9DB.

Then, as illustrated in FIG. 9E, another end side (35*b*) on which the electrode is not cut off is cut off from a remaining region (base portion) 25*b*' along L31. A resistor of butted structure for use in the current detection device according to the first embodiment can be formed. The manufacturing method according to the present embodiment provides the advantage that the resistor composed of electrodes 35*a*, 35*b* and a resistive body 31 can be mass-produced.

Figure 9F:
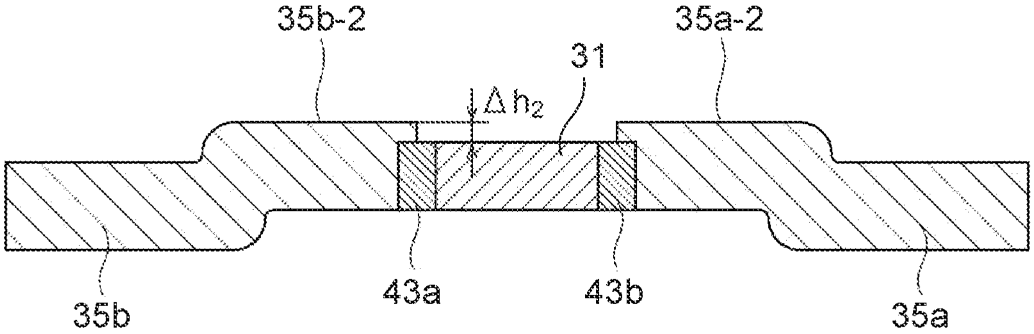
FIG. 9F illustrates a cross sectional view of a shunt resistor produced by the manufacturing process for the shunt resistor according to the third embodiment of the present invention.

Note that, as illustrated in FIG. 9F, the resistor has weld marks 43*a*, 43*b* formed thereon. Generally, the surface of weld marks by an electron beam or the like is in a coarse state. While it is preferable to affix bonding wires as close to the resistive body as possible for precise current detection, the weld marks can get in the way. According to the present example, the formation of such weld marks on regions 35*a*-2, 35*b*-2 that form bonding surfaces can be avoided by the method described with reference to FIGS. 9CA and 9CB. Thus, the advantage of being able to affix wires close to the resistive body can be obtained.

The shunt resistor according to the present embodiment has a specific resistance in the range of 15 to 25 μΩ·cm.

Further, the resistance alloy has a TCR less than or equal to $100\times10^{-6}$/K (25-100° C.).

Further, the resistance alloy has a thermal electromotive force with respect to copper within ±1 μV/K. Further, the thermal electromotive force with respect to copper may be within ±0.5 μV/K, or even within ±0.2 μV/K.

With the above characteristics, the resistance alloy is suitable for small-sized and low-resistance shunt resistors, and a low TCR value can also be achieved. The current detection accuracy of a current detection device using the shunt resistor is improved, and the space required by the current detection device can be reduced by reduction in size of the shunt resistor.

In the foregoing embodiments, the illustrated configurations and the like are not limiting and may be modified, as appropriate, within a range in which the effects of the present invention can be obtained. Other modifications may also be made and implemented without departing from the scope of the purpose of the present invention.

The constituent elements of the present invention may be optionally selectively added or omitted, and an invention having an optionally selectively added or omitted configuration is also included in the present invention.

INDUSTRIAL APPLICATION

The present invention may be utilized as an alloy for a resistor.

All publications, patents and patent applications cited in the present description are incorporated herein by reference in their entirety.

What is claimed is:

1. A resistance alloy for use in a current detection shunt resistor, the resistance alloy being a quaternary alloy consisting of copper, manganese, silicon, and iron, and comprising 4.5 to 5.5 mass % of manganese, 0.05 to 0.30 mass % of silicon, 0.10 to 0.30 mass % of iron, and a balance being copper, and having a specific resistance of 15 to 25 μΩ·cm, wherein a silicon oxide is formed on a surface of the resistance alloy.

2. The resistance alloy according to claim 1, having a temperature coefficient of resistance ("TCR") less than or equal to $100\times10^{-6}$/K.

3. The resistance alloy according to claim 1, having a thermal electromotive force with respect to copper within ±μV/K.

4. Use of the resistance alloy according to claim 1, in a resistive body of a shunt resistor for use in a current detection device.

5. A current detection shunt resistor comprising a resistive body and an electrode, wherein the resistive body is a quaternary alloy consisting of copper, manganese, silicon, and iron, and comprising 4.5 to 5.5 mass % of manganese, 0.05 to 0.30 mass % of silicon, 0.10 to 0.30 mass % of iron, and a balance being copper, and having a specific resistance of 15 to 25 μΩ·cm, and wherein a silicon oxide is formed on a surface of the resistive body.

* * * * *